Feb. 28, 1939. W. R. WILEY 2,148,847
CLIP
Filed Nov. 9, 1936

INVENTOR.
William R. Wiley.
BY
Harness, Dickey, Pierce & Hann.
ATTORNEYS.

Patented Feb. 28, 1939

2,148,847

UNITED STATES PATENT OFFICE 2,148,847

CLIP

William R. Wiley, Detroit, Mich.

Application November 9, 1936, Serial No. 109,922

2 Claims. (Cl. 189—88)

This invention relates to clips. More particularly, it relates to a novel and improved form of tempered steel clip primarily adapted for use in securing a generally channel shaped molding strip in position adjacent the marginal edge of a sheet metal panel.

Clips of this generic type are primarily utilized for the purpose of securing decorative moldings upon automotive vehicle bodies in order to provide an attractive ornamental finish for the marginal edges of the sheet metal panels of which such bodies are in the main composed.

Heretofore, many and various types of clips have been utilized for accomplishing this general purpose and it is the object of the present invention to provide a clip which is extremely simple in construction, cheap to manufacture, and one which provides an extremely strong and positive engagement with the various members with which it is associated.

It is a still further object of the present invention to provide a clip construction of this generic type which is extremely easily installed in the molding which it serves to mount and which likewise is extremely easily mounted upon the margin of the sheet metal panel with which it is associated and may be mounted in a manner which serves to position accurately the molding strip with respect to the sheet metal panel.

The invention contemplates a clip construction having novel means for mounting the clip within the molding strip in such a manner that the relative longitudinal position of the clip may easily and conveniently be adjusted without removing the clip from the molding strip and still further, contemplates the construction of a clip which is extremely conveniently attachable to the sheet metal panel on which it is desired to mount the molding strip.

Many other and further objects, advantages, and features of the present invention will become clearly apparent from the following specification when considered in connection with the accompanying drawing forming a part thereof.

Figure 1:
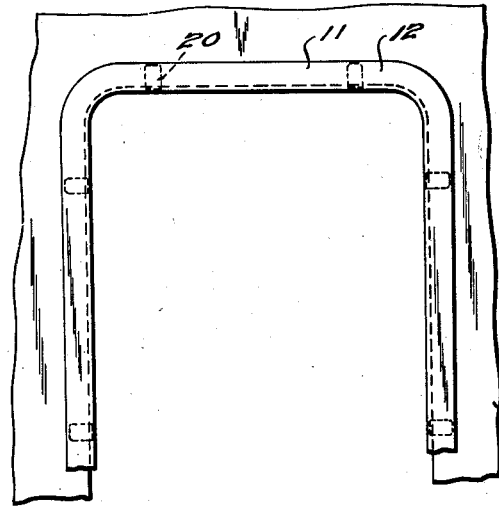
Figure 1 is a fragmentary view of a portion of a vehicle body illustrating a sheet metal panel having a molding strip mounted thereon by means of the improved clips of the present invention.
Figure 2:
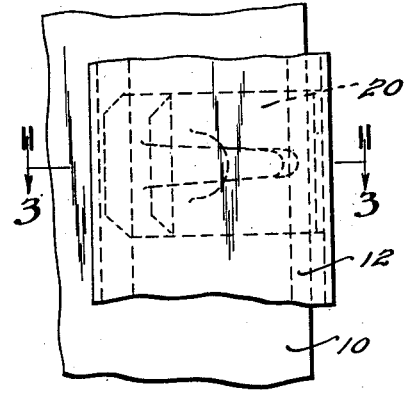
Fig. 2 is an enlarged fragmentary elevational view showing the manner in which the clips serve to secure the molding strip in position.

With more particular reference to the drawing, it will be readily understood that the improved clips of the present invention, while susceptible of use in many and various different installations, are adapted primarily for the purpose of securing a molding strip of novel cross-sectional configuration in predetermined position with respect to the marginal edge of a sheet metal panel in order to conceal this marginal edge and provide an ornamental and decorative finish therefor.

While it will be readily understood that these clips may be utilized for the purpose of securing a molding strip to the marginal edge of any sheet metal member, in the specific form of the invention shown a sheet metal panel 10 is provided having an opening therein and a molding strip 11 is secured to the marginal edge of the sheet metal panel 10 in the opening by means of improved clips 12 which serve to secure the molding strip in position.

Figure 3:
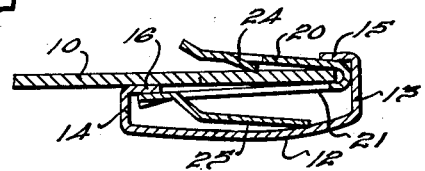
Fig. 3 is a transverse sectional view taken substantially on the line 3—3 of Fig. 2 illustrating in detail the construction of the improved clip and the manner in which the same is mounted with respect to the molding strip and sheet metal panel.
Figure 4:
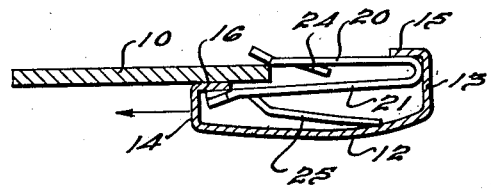
Fig. 4 is a transverse sectional view similar to Fig. 3 illustrating in detail the manner in which the improved molding strip with the clips mounted therein is installed in position.

The molding strip 11 is of generally channel cross-section and includes substantially parallel side walls 13 and 14 respectively, and it will be noted by reference to Figs. 3 and 4 that the side wall 13 is of substantially greater width than the side wall 14 and that the marginal edges of both of these side wall members 13 and 14 are bent inwardly toward each other to provide inturned flanges 15 and 16 respectively. It will, therefore, be readily understood that while the molding strip is of generally channel shape, the channel is provided with overhanging edges which are virtually essential to the installation of the improved clips hereinafter described in detail.

The clips which form the subject matter of the present invention are preferably made from a single integral sheet metal stamping formed of relatively high carbon steel which, after the clips have been stamped to predetermined form, is heat treated or tempered to provide a clip having a hardness substantially harder than the sheet metal members with which it is to be subsequently associated. This hardening or tempering of the sheet metal clip is of particular importance in connection with the present invention and plays, as will hereinafter be more clearly seen, an important part in positively locking the molding strip 12 in position with respect to the sheet metal panel. The strength of the lock obtained between the clip and the sheet metal panel is largely dependent upon the hardness of the clip and the extreme elasticity and resilience thereof.

The clip includes a sheet metal member bent upon itself to provide a pair of arms 20 and 21 which normally lie substantially parallel to and in spaced relation with respect to each other, the arm 21 being preferably formed slightly longer than the arm 20. The arm 21 is of a length slightly less than the interior transverse distance between the side walls 14 and 13 with which it is to be associated. The corners of the arm 21 may be dubbed off at 22 to facilitate the installation of the clip as a whole. The importance of this feature will become more clear hereinafter.

The arm 20 is provided with an up-struck tang or lug 24 which projects inwardly toward the opposite arm 21. The arm 21 is provided with a somewhat similar but considerably larger up-struck lug 25 which is offset from the body of the arm 21 a substantial distance.

Figure 5:
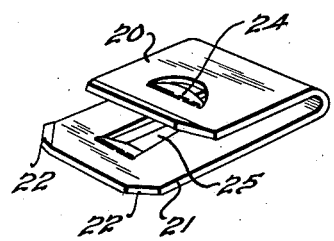
Fig. 5 is a perspective view of one of the clips embodying the improvements of the present invention.

Due to the fact that the clip as a whole is hardened or tempered after it has been stamped to the form shown in Fig. 5, both of the lugs 24 and 25 as well as the body of the clip will not only be extremely hard but will also be extremely resilient.

In the utilization of the clip disclosed in Fig. 5, it will be seen that the over-all width of the clip is such that it may conveniently be dropped into the channel member 12 between the flanges 15 and 16 and may be depressed therein with the lug 25 abutting against the base of this channel member. Due to the fact that this lug is extremely resilient, it will be compressed and the clip may then bodily be turned through 90° until it assumes substantially the position shown in Fig. 4 of the drawing. It will be understood that when the clip is in this position, the exterior surface of the arm 20 will engage the under surface of the inturned flange 15 while the inner surface of the arm 21 will engage the inner surface of the inturned flange 16 and the inherent resiliency of the lug 25 will maintain the clip firmly seated in position. The dubbed off corners 22 will facilitate the turning of the clip after it has been seated within the channel and permit its disposition in the position shown in Figs. 3 and 4. While in this position, the lug 25 will retain the clip resiliently seated in position.

A plurality of these clips may be installed within the molding strip and the molding strip may then be mounted on the panel 10 in substantially the manner illustrated in Fig. 4. The strip is slid in a direction parallel to the panel and the marginal edge of the panel will be received between the arms 20 and 21 of the clip and the up-struck lug 24 will serve to positively lock the clip and subsequently the molding strip carried thereby in position upon the panel. Due to the fact that the clips have been hardened, the edge of the up-struck lug 24 will dig into the metal of the panel and preclude displacement of the clips and, likewise, the molding strip carried thereby. The hardening and tempering of the clips also serves to provide a resilient construction which positively urges the lug 24 into engagement with the surface of the panel.

While it will be readily understood that the embodiment of the invention described above is merely illustrative of the inventive concept presented in this application, many other and further modifications thereof, falling within the scope of the invention as defined in the subjoined claims, will become clearly apparent to those skilled in the art.

What is claimed is:

1. In combination a sheet metal panel, a molding strip, a clip for securing said molding strip in fixed position at the marginal edge of said sheet metal panel, said clip comprising a sheet metal member bent upon itself to provide a pair of arms adapted to receive the marginal edge of said sheet metal panel therebetween, one of said arms being provided with means thereon adapted to seat within and anchor said clip within said molding strip, the other of said arms having an inwardly struck lug to dig into the surface of said panel to lock said clip in position thereon whereby said clip serves to secure said molding strip in fixed position with respect to said panel.

2. In combination, a sheet metal panel, a molding strip, a clip for securing said molding strip in fixed position at the marginal edge of said sheet metal panel, said clip comprising a sheet metal member bent upon itself to provide a pair of arms adapted to receive the marginal edge of said sheet metal panel therebetween, one of said arms having an outwardly struck lug serving to resiliently bear against said molding strip to anchor said clip within said molding strip, the other of said arms having an inwardly struck lug to dig into the surface of said panel to lock said clip in position thereon whereby said clip serves to secure said molding strip in fixed position with respect to said panel.

WILLIAM R. WILEY.